United States Patent
Berrier et al.

(10) Patent No.: US 6,744,854 B2
(45) Date of Patent: Jun. 1, 2004

(54) DETECTION OF BRIDGE TAPS BY FREQUENCY DOMAIN REFLECTOMETRY-BASED SIGNAL PROCESSING WITH PRECURSOR SIGNAL CONDITIONING

(75) Inventors: Travis Lee Berrier, Melbourne, FL (US); Roy Lujan Soto, Moorpark, CA (US); Wayne Kwok-Wai Wong, Camarillo, CA (US)

(73) Assignee: Harris Corporation, Melbourne, FL (US)

( * ) Notice: Subject to any disclaimer, the term of this patent is extended or adjusted under 35 U.S.C. 154(b) by 195 days.

(21) Appl. No.: 10/042,769

(22) Filed: Jan. 9, 2002

(65) Prior Publication Data

US 2002/0090059 A1 Jul. 11, 2002

Related U.S. Application Data

(63) Continuation-in-part of application No. 09/456,681, filed on Dec. 9, 1999.

(51) Int. Cl.[7] .................... H04M 1/24; H04M 3/08; H04M 3/22
(52) U.S. Cl. .............. 379/22.03; 379/22; 379/22.02; 379/24; 379/2; 379/27.03; 379/1.01
(58) Field of Search .................. 379/1.01, 1.03, 379/1.04, 14.01, 10.01, 10.02, 10.03, 15.05, 21, 22, 22.01, 22.02, 22.03, 27.07, 22.08, 24, 27.01, 27.02, 27.03, 27.04, 29.01

(56) References Cited

U.S. PATENT DOCUMENTS

| | | | |
|---|---|---|---|
| 3,870,838 A | 3/1975 | Corwin et al. | 179/175.31 R |
| 4,630,228 A | 12/1986 | Tarczy-Hornoch et al. | 364/756 |
| 4,812,738 A | 3/1989 | Itaya et al. | 324/58 |
| 4,924,492 A * | 5/1990 | Gitlin et al. | 379/93.08 |
| 5,195,107 A * | 3/1993 | Wei | 375/290 |
| 5,793,801 A * | 8/1998 | Fertner | 375/219 |
| 5,881,130 A | 3/1999 | Zhang | 379/6 |
| 5,949,236 A | 9/1999 | Franchville | 324/533 |
| 5,994,905 A | 11/1999 | Franchville | 324/533 |
| 6,014,425 A | 1/2000 | Bingel et al. | 379/27 |
| 6,144,721 A | 11/2000 | Stephens | 379/21 |
| 6,177,801 B1 | 1/2001 | Chong | 324/520 |
| 6,256,377 B1 | 7/2001 | Murphree et al. | 379/24 |
| 6,266,395 B1 | 7/2001 | Liu et al. | 379/27 |
| 6,292,539 B1 | 9/2001 | Eichen et al. | 379/1.04 |
| 6,466,649 B1 * | 10/2002 | Walance et al. | 379/22.03 |
| 6,531,879 B1 | 3/2003 | Nero, Jr. | 324/534 |
| 6,538,451 B1 | 3/2003 | Galli et al. | 324/533 |

FOREIGN PATENT DOCUMENTS

| | | | |
|---|---|---|---|
| CA | 2281208 | 2/2001 | H04M/3/22 |

* cited by examiner

*Primary Examiner*—Quoc D. Tran
(74) *Attorney, Agent, or Firm*—Allen, Dyer, Doppelt, Milbrath & Gilchrist, P.A.

(57) ABSTRACT

A frequency domain reflectometry-based bridged tap detection system for a telecommunication wireline employs a prescribed filtering operator, such as a 'best-fit' curve filter or a piecewise high pass filter bank, upstream of a Fourier processing operator, to improve the signal-to-noise ratio of the digitized amplitude array of the swept frequency band. To fit the response tones within the dynamic range of the analog-to-digital converter that digitizes the response tones detected from the wireline, a signal conditioning circuit, comprised of a comb filter bank, envelope detector and compander, is installed between the test head and the input to the analog-to-digital converter.

20 Claims, 5 Drawing Sheets

DETECTION OF BRIDGE TAPS BY FREQUENCY DOMAIN REFLECTOMETRY-BASED SIGNAL PROCESSING WITH PRECURSOR SIGNAL CONDITIONING

CROSS-REFERENCE TO RELATED APPLICATION

The present application is a continuation-in-part of co-pending U.S. patent application Ser. No. 09/456,681, filed Dec. 9, 1999, by R. Walance et al, entitled: "Detection of Bridged Taps by Frequency Domain Reflectometry" (hereinafter referred to as the '681 application), assigned to the assignee of the present application and the disclosure of which is incorporated herein.

FIELD OF THE INVENTION

The present invention is directed in general to wireline telecommunication systems, and more particularly to an enhancement of a frequency domain reflectometry (FDR)-based, energy reflection anomaly-locating mechanism of the type disclosed in the '681 application, including the use of a precursor signal conditioning circuit for improving the performance of the FDR signal processing subsystem.

BACKGROUND OF THE INVENTION

As described in the above-referenced '681 application, telecommunication service providers are continually seeking ways to optimize the bandwidth and digital signal transport distance of their very substantial existing copper plant, which was originally installed for the purpose of carrying nothing more than conventional analog (plain old telephone service or POTS) signals. In addition to the inherent bandwidth limitations of the (twisted pair) copper wire medium, service providers must deal with the fact that in-place metallic cable plants, such as that shown at 10 in the reduced complexity network diagram of FIG. 1, linking a central office 12 with a subscriber site 14, typically contain one or more anomalies, such as but not limited to load coils (used to enhance the wireline's three to four kilohertz voice response), and bridged taps 16, to which unterminated (and therefore reflective) lateral twisted pairs 18 of varying lengths may be connected.

Because these discontinuities cause a portion of the energy propagating along the wireline link to be reflected back in the direction of the source, at the high frequencies used for digital data communications (e.g., on the order of one MHz), such reflections can cause a significant reduction in signal amplitude, when (counter-phase) combined with the original signal, disrupting digital data service. To locate these reflection points, it has been conventional practice to employ interactive, time domain reflectometry (TDR), which relies upon the ability of a skilled technician to make a visual interpretation of a displayed TDR waveform, and thereby hopefully identify the bridged taps, and the lengths of any laterals that may extend therefrom. Because this process is subjective, it is imprecise and very difficult to automate.

In accordance with the invention disclosed in the '681 application, shortcomings of a conventional TDR-based scheme for locating energy reflecting anomalies are obviated by stimulating the line with a linearly stepped frequency sinusoidal waveform, and analyzing the composite waveform response by means of frequency domain reflectometry, whose frequency bins represent distances that are integral multiples of delay, so that there is a one-for-one correspondence between the bins of a Discrete Fourier Transform (DFT) and distances to the reflection points along the wireline.

The frequency domain reflectometry system of the '681 application is diagrammatically illustrated in FIG. 2 as comprising a processor-controlled test head 20 (such as may be installed in a central office, or included as part of test signal generation and processing circuitry of a portable craftsperson's test set), coupled to an access location 21 of a line under test (LUT) 22 by means of a line-driver amplifier 24 and an input receiver amplifier 26. Line-driver amplifier 24 is coupled to the LUT 22 through source resistors 27, 28, each having an impedance equal to one-half the impedance (Zo) of the metallic line pair.

Coupled to the test head 20 is a control processor 30, that is programmed with an FDR test routine shown in the functional block diagram of FIG. 3. As shown therein, an initial tone generation function 31 generates a series of digitally created test signals, in particular a sequence of discrete frequency sinusoidal tones, to produce what is in effect a frequency-swept sinusoidal waveform. The swept frequency waveform may be varied in a linear, stepwise manner, for example beginning at minimum frequency such as 0 Hz and stepped in incremental frequency steps up to a maximum frequency. (Conversely, the frequency variation may begin at an upper frequency and proceed to a minimum frequency, without a loss in generality.) These tones are applied (via the line-driver amplifier 24 of FIG. 2) to the line under test 22.

As the frequency of the sinusoidal waveform is swept, the wireline's response signal level at the test access point 21 is monitored (via the input amplifier 26), digitized by way of an analog-to-digital converter (ADC) 32, and stored in a signal measurement buffer (not shown). The amplitude of the measured signal response will exhibit a variation with frequency that is a composite of the fluctuations in impedance due to any reflection points along the LUT. In order to optimize the accuracy of the analysis, the response data may be selectively modified by a bandpass filter BPF 33, the center frequency of which is varied, or 'slides', along the variation of frequency of the swept sinusoid being applied to the LUT. This filtering operation serves to remove any DC level and discontinuities that might cause spurious results, between start and end sample values of the data. The filtered data is then stored with each frequency step iteration, to produce a sampled amplitude array 34. A loss compensation function (LCF) may also be applied to the data set, to compensate the frequency response characteristic of the LUT for loss over distance and frequency.

The line under test can be characterized in terms of its resistance (R), inductance (L), capacitance (C), and conductance (G) parameters per unit length, which are available from tabulated industry-available sources for the type of wire. From these parameters, a frequency-dependent propagation constant τ can be derived as:

$$\tau = \alpha + j\beta = ((R+jwL)(G+jwC))^{1/2}, \text{ where } w = 2\Pi f.$$

The real part of the propagation constant, $\alpha(f)$, is the attenuation along the line per unit length. Since the envelope of a signal propagating along the line as a function of distance is attenuated by $e^{-\alpha(f)r}$, $\alpha(f)$ can be determined.

The effect on the frequency response waveform is that amplitude decay is less pronounced for reflected signals propagating on shorter loops, since the shorter distance offsets the effects of the loss at high frequencies, due to the effects of $\alpha(f)$. Since the actual length of the line under test is unknown, a compromise between the two extremes may be employed, to provide compensation for the overall frequency response waveform for all distances of interest.

In order to determine the coefficient of the exponential attenuation function in terms of frequency, it is necessary to reduce the number of degrees of freedom of the total loss function. Since the maximum frequency of the swept sinusoidal waveform is known, a priori, a loss compensation function based upon the mid frequency point of the sweep $f_{mid}=f_{max}/2$ may be employed. As will be described in detail below with reference to the amplitude vs. frequency response diagram of FIG. 4, from this mid frequency, $f_{mid}$, a corresponding resolution distance $d_{mid}$ is defined as:

$$d_{mid}=V_p/4f_{mid}$$

An 'average loss' value η can be derived as:

$$\eta=e^{-\alpha(fmid)dmid}$$

The loss compensation function LCF can therefore be defined as:

$$LCF=\exp((-2ln(\eta)/f_{max})f).$$

This loss-compensated data is processed in accordance with a frequency analysis operator, such as Discrete Fourier Transform (DFT) 35, which decomposes the composite line signal response into frequency bins associated with the individual reflectors' frequency fluctuations.

Next, the Fourier transform-processed data is coupled to a tap decision operator 36, the output of which is coupled to a remote terminal unit 37. The tap decision operator employs a threshold established for the contents of the frequency bin data produced by the DFT, in order to distinguish between significant (useful) and spurious energy. The threshold employed may be is defined as:

Threshold(bin no.)=[(StartValue−EndValue)*exp(−bin no.*slope)]+EndValue.

The parameters StartValue, EndValue and slope are dependent upon the test head circuitry's gain and swept bandwidth, and are empirically determined. A frequency bin is considered to contain significant energy, if its contents exceed the threshold for that bin number.

Any frequency bin whose contents exceed its threshold are subjected to waveform analysis of the type used in frequency domain reflectometry. For an arbitrary waveform v(t) that is the sum of two waveforms of some frequency $f_o$, a minimum will occur in v(t) at some delay $t_o$ of one waveform relative to the other. For a wireline cable plant, this occurs when a waveform $v_o$ propagating downstream along the wireline is combined with a waveform $v_1$ reflected from an anomaly, such as a bridged tap and returning upstream along that wireline.

In general, the combination of these two waveforms can be expressed as:

$$v(t)=v_o(t)+v_1([t-t_o])$$

$$v(t)=V_o \sin(2\Pi f_o t)+V_1 \sin(2\Pi f_o[t-t_o]).$$

Since the downstream and upstream propagating waveform components have the same frequency, v(t) will have a local minimum due to destructive interference at some time delay $t_o$ when the arguments of $v_o$ and $v_1$ differ by Π radians. Namely, $$(2\Pi f_o t)-(2\Pi f_o[t-t_o])=\Pi.$$

Dividing this expression by $2\Pi f_o t$ and solving for $t_o$, yields:

$$t_o=1/2f_o=T_o/2,$$

where the period $T_o$ of the waveform is $1/2f_o$.

As shown in the decaying waveform amplitude vs. frequency diagram of FIG. 4, a null occurs at $f_o$; nulls in v(t) also occur for frequencies $f_k$, where $f_k>f_o$, and the arguments of $v_o$ and $v_1$ differ by odd multiples of Π. If k is a positive integer, the nulls will occur when:

$$(2\Pi f_k t)-(2\Pi f_k[t-t_o])=2\Pi f_k t_o=(2k+1)\Pi.$$

Letting the period $T_k=1/f_k$, then $$2\Pi f_k t_o=2\Pi t_o/T_k=2\Pi(T_o/2)/T_k=(2k+1)\Pi.$$

$$T_o/T_k=(2k+1)$$

Substituting $T_o=1/f_o$, $T_k=1/f_k$:

$$f_k/f_o=(2k+1),$$

or $$f_k=f_o(2k+1), \text{ for } k=0, 1, 2, \ldots$$

The periodicity of the nulls can be seen by examining the difference in frequency between two adjacent nulls $f_m$ and $f_{m+1}$.

From the foregoing, $f_{m+1}-f_m=f_o(2[m+1]+1)-f_o(2m+1)=2f_o$, for m=0, 1, 2, ...

This means that a linear sweep of a wireline having a single reflection point (e.g., bridged tap) will produce nulls in the frequency response at frequencies $f_o$, $3f_o$, $5f_o$, $7_o$, etc., as shown in the amplitude vs. frequency response diagram of FIG. 4.

Denoting $F_o$ as the repetition rate of the nulls for $t=t_o$ in the frequency domain, then:

$$F_o=1/(\text{period of the null})=1/(f_{m+1}-f_m)=\tfrac{1}{2}f_o\Pi.$$

In general, the null repetition rate in the frequency domain $F_n$ is given by: $F_n=1/2f_n$, where $f_n$ is the lowest frequency at which a null occurs when the delay $t=t_n$.

From the above relationships, $F_o$ corresponds to $t_o$ and, in general $F_n$ corresponds to $t_n$, and is the same as the round-trip delay of the signal from the wireline access location to the point of reflection and back. In order to determine the length of time required for the waveform to propagate to an impedance-mismatch reflection point, it may be observed that $t_o$ is representative of the total time required for the downstream propagating waveform to be reflected back to the access location 21 at which the measurement is taken. This one-way delay $t_i=t_o$. To determine the distance to this reflection point from the access location, the propagation velocity $v_P$ of the waveform along the wireline must be known.

In general, using $\epsilon_r$ as the dielectric constant of the wireline insulation, c as the velocity of light in free space, and $\mu_r$ as relative permeability, then the propagation velocity along the wireline may be expressed as: $v_P=c(\epsilon_r\mu_r)^{-1/2}$.

Knowing the type of cable from industry available specifications allows the propagation velocity (typically on the order of ⅔ the velocity of light) to be readily determined.

The distance D from the access location to the location of the impedance mismatch reflection (e.g., bridge tap) may be given by the expression:

$$D=t_i v_P=v_P t_o/2=T_o v_P/4.$$

Thus, D is proportional to $T_o/4$, which is one-quarter wavelength of the sinusoid waveform having a frequency $f_o$. Substituting $T_o = 1/f_o$, yields $D = v_p/4f_o$.

Namely, the distance D is inversely proportional to frequency. This means that the minimum resolvable distance $D_{min} = v_p/2f_{max}$.

As pointed out above, the response waveform v(t) seen at the signal measurement point will contain components produced by a plurality of reflection points as:

$$v(t) = v_o(t) + v_1(t-t_o) + v_2(t-t_1) + v_3(t-t_2) + \ldots v_n(t-t_{n-1}).$$

Since these components are associated in general with impedance discontinuities caused by physical characteristics in the wireline separated by varying distances from the source, the delays $t_o, t_1, \ldots t_{n-1}$, associated with these reflections will be mutually different, so that the values $T_o/2$, $T_1/2, \ldots T_{n-1}/2$, and thus the frequencies $f_o, f_1, \ldots f_{n-1}$, will be mutually different.

As $f_n$ is unique for each delay, then by identifying the various frequencies $f_n$, the two-way delay times $t_n$ of a reflection from a wireline discontinuity may be readily determined. As pointed out above, once the time delay is known, the distance D to the impedance mismatch discontinuity (e.g., bridged tap) may be readily determined.

To determine the individual values of two-way delay time $t_n$, a frequency response waveform a(f) produced by stimulating the wireline with a linearly swept sinusoidal waveform is formed of samples at discrete frequency steps of $(f_{max}/N)$. For a radix-two buffer size of N points, the output of the DFT operation will yield values that are proportional to the magnitudes of the various null repetition rates $F_k$. If the maximum frequency $f_{max}$ of the swept sinusoid waveform is $2f_o$, then the minimum resolution of the DFT is:

$$\text{Minimum resolution} = 1/f_{max} = 1/2f_o = F_o = t_o \text{ (seconds)}.$$

Denoting the contents of frequency bin m as A(m) of the DFT of a(k), then the contents A(1) of the first frequency bin are the DC component of the swept response, while the bin m contains the magnitude of the null repetition rate $(m-1)F_o$, for $m=2, 3, 4, \ldots N/2$. Namely, the various energy bins of the response A represent the energy in a(f) associated with the different round trip time delays $t_o, 2t_o, 3t_o$, etc., and A(m) contains the magnitude of the waveforms delayed by $(m-1)$ $t_o$ for $m=2, 3, 4, \ldots N/2$. The contents of the bins are used to calculate distances from the wireline access location to the energy-reflecting anomalies. In particular, the distance $D_{RP}$ to a reflection point RP is determined by multiplying the one-way delay $t_{RP}$ by the velocity of propagation $v_p$ of the waveform. Namely, $D_{m-1} = (m-1)t_o v_p/2 = [(m-1)t_o]v_p/2$ for $m=2, 3, 4, \ldots N/2$, so that there is a one-to-one correspondence between the bins of DFT and the distances to the reflection points along the wireline.

Although the FDR scheme described above works well for short to medium distance lines (e.g., up to wireline distances on the order of 15 Kft), it has been found that the signal-to-noise ratio (SNR) of the processed response characteristic decreases dramatically for longer distances (e.g., on the order of 18 Kft and beyond).

SUMMARY OF THE INVENTION

In accordance with the invention, this longer distance-associated SNR reduction problem is successfully addressed by modifying the FDR processing mechanism disclosed in the '681 application, to incorporate a prescribed precursor response filtering operator prior to the Fourier processing operation. As will be described, this precursor response filter may take the form of a precise curve-fitting operator or a piecewise high pass filter bank. In addition, the Fourier processing operator is implemented as a Fast Fourier Transform (FFT) operator rather than a Discrete Fourier Transform (DFT). The FFT operator may in actuality comprise an inverse FFT operator (FFT$^{-1}$), since the input to this block is frequency data and its output is related to time (distance) data, and performing either of an FFT or an inverse FFT on the input data produces identical outputs.

The 'best-fit' curve-based precursor response filter of the first embodiment produces a response characteristic which very closely 'fits' the decaying profile of the amplitude array along which ride the very small perturbations. This best fit profile is differentially combined with the original amplitude array to realize a set of more clearly delineated amplitudes along the swept frequency band, which are readily identified in the FFT to which the filtered data is applied.

The high pass filter bank of the second embodiment is formed of a pair of parallel high pass filters having Z-domain transfer functions associated with respectively different distance wireline segments. One of the filters detects discontinuities at relatively short to medium distances (e.g., on the order of distances up to 10 Kft from the wireline access location) associated with relatively low frequency components, while the other high pass filter detects discontinuities at relatively greater distances (e.g., on the order of distances from 10 Kft to 18 Kft and beyond from the wireline access location) associated with relatively high frequency components.

The outputs of the high pass filters are respectively coupled to associated FFT operators whose outputs are piece-wise combined to realize a composite characteristic that is effective to emphasize response components over the total distance of the two distance segments. A level-shifter may be used to provide for a relatively smooth coupling of the two FFT response characteristics.

Although each of the above embodiments enhances the ability of an FDR system of the type to extract very small amplitude signals particularly those of the higher frequency tones, and thereby locate energy reflection anomalies such as bridged taps along a relatively extended distance wireline, the ability to process such reduced amplitude response signals means that the signal processing system must have a very large dynamic range. This implies that the resolution of the analog-to-digital converter used to digitize the data values of the amplitude array must be relatively wide.

This dynamic range issue is handled by installing a signal conditioning circuit between the test head and the analog-to-digital converter. The signal conditioning circuit is comprised of a cascaded arrangement of a comb filter bank contains N band-pass filters, an envelope detector, and a compander. The envelope detector converts the output frequencies from the comb filter into DC levels corresponding to the amplitudes of the peaks of the tones. The compander increases the gain of higher frequencies, so that, given an exponentially decreasing input function, it produces a relatively linear output, with a more uniform representation in the input range of the analog-to-digital converter, as desired.

DETAILED DESCRIPTION

Figure 1:
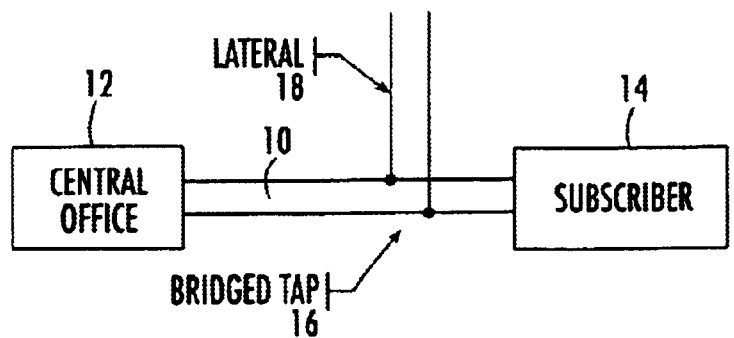
FIG. 1 is a reduced complexity network diagram showing an unterminated twisted pair extending from a bridged tap installed in a wireline communication link between a central office and a subscriber circuit.
Figure 2:
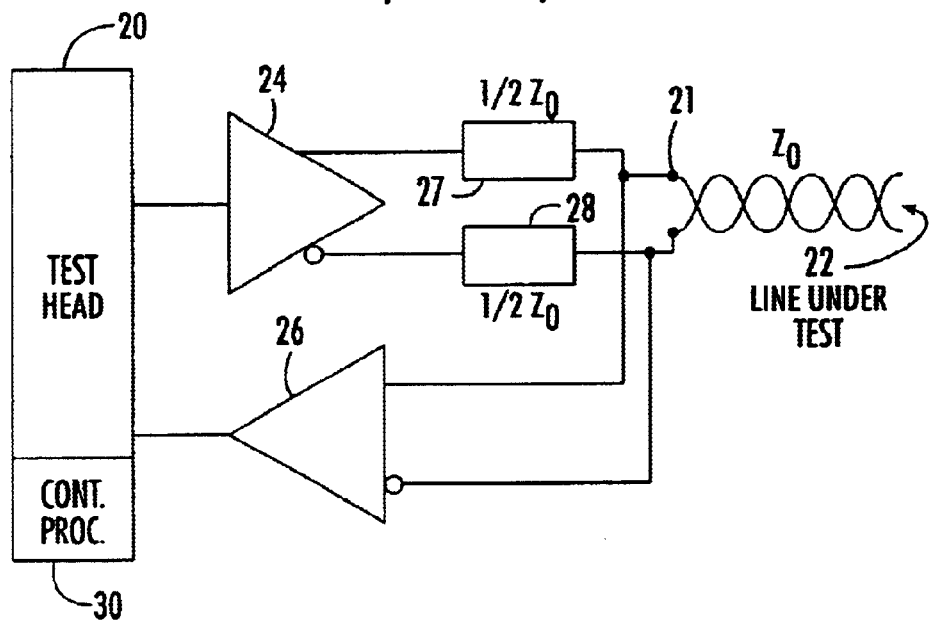
FIG. 2 diagrammatically illustrates a reduced complexity embodiment of an automated FDR-based bridged tap detection arrangement in accordance with the invention described in the above-referenced '681 application.

Before detailing the enhanced FDR-based energy reflection location mechanism of the present invention, it should be observed that the invention resides primarily in a prescribed arrangement of conventional communication hardware components and attendant supervisory communications microprocessor circuitry and application software therefor, that controls the operations of such components and the analysis of signal waveforms interfaced therewith. In a practical implementation that facilitates their incorporation into telecommunication link test equipment (such as that which may be installed at a central office or resident in a portable test device), the inventive arrangement may be readily implemented using a general purpose digital computer, or field programmable gate array (FPGA)-configured, application specific integrated circuit (ASIC) chip sets. In terms of a practical hardware implementation of such chip sets, digital ASICs are preferred.

Consequently, the configuration of such components and the manner in which they may be interfaced with a wireline communication link have, for the most part, been illustrated in the drawings by readily understandable block diagrams and flow charts, which show only those specific details that are pertinent to the present invention, so as not to obscure the disclosure with details which will be readily apparent to those skilled in the art having the benefit of the description herein. Thus, the block diagram and flow chart illustrations of the Figures are primarily intended to show the major components and functional modules of the system of the invention in convenient functional groupings, whereby the present invention may be more readily understood.

Figure 3:
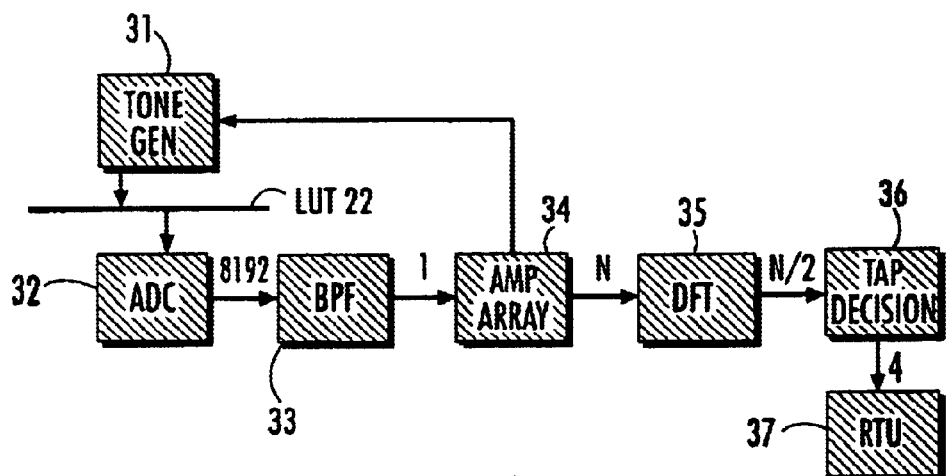
FIG. 3 is a block diagram showing respective functions carried out by the FDR-based bridged tap detection arrangement of FIG. 2.
Figure 5:
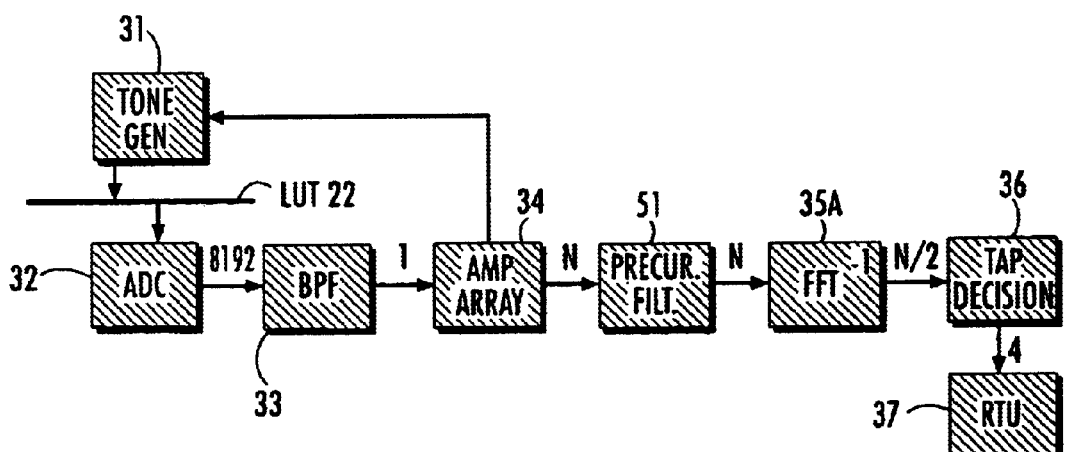
FIG. 5 shows a modification of the FDR-based bridged tap scheme of the '681 application shown in the functional block diagram of FIG. 3 to include a precursor amplitude array response filtering operator to filter the array values supplied to the Fourier processing operator.

Attention is now directed to FIG. 5, which shows the manner in which the FDR-based bridged tap scheme of the '681 application, depicted in the functional block diagram of FIG. 3, is modifiable to include a precursor response filtering operator 51, prior to applying the response data of the amplitude array 34 to the Fourier processing operator 35. In addition, FIG. 5 shows the Fourier processing operator 35 implemented as a Fast Fourier Transform (FFT) operator 35A, rather than a Discrete Fourier Transform (DFT) operator in the functional block diagram of FIG. 3. It should be noted that the FFT operator 35A may in actuality comprise an inverse FFT operator ($FFT^{-1}$), since the input to this block is frequency data and its output is related to time (distance) data, and performing either of an FFT or an inverse FFT on the input data produces identical outputs.

Figure 4:
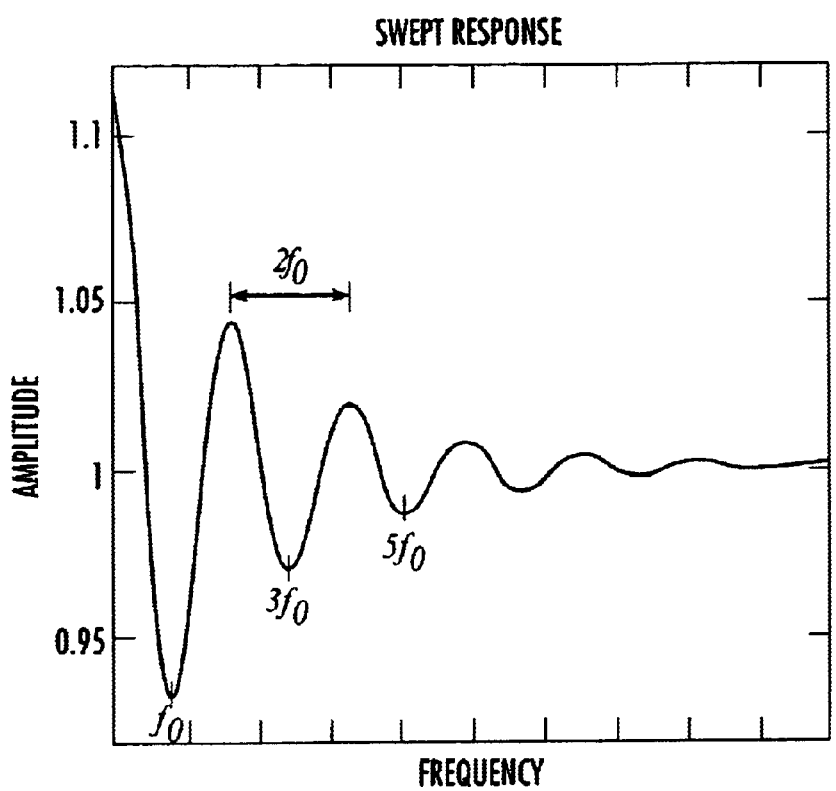
FIG. 4 is a frequency sweep response characteristic obtained in the course of executing the FDR-based bridged tap detection operations of FIG. 3.
Figure 6:
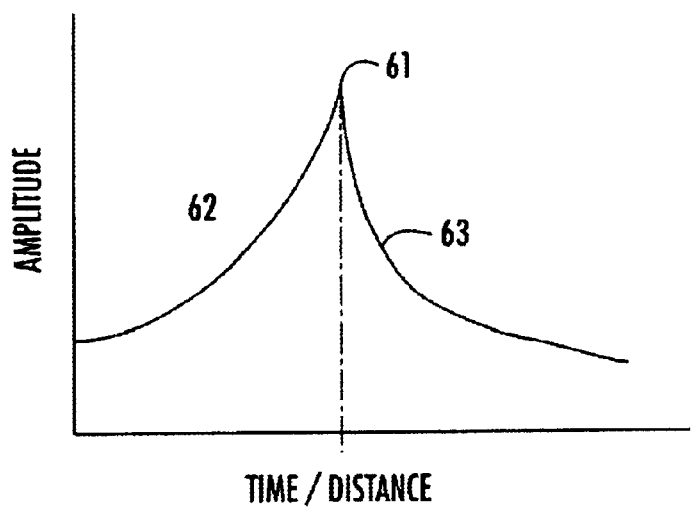
FIG. 6 shows an FFT amplitude vs. time/distance plot for amplitude vs. frequency response data for relatively short to medium distances.
Figure 7:
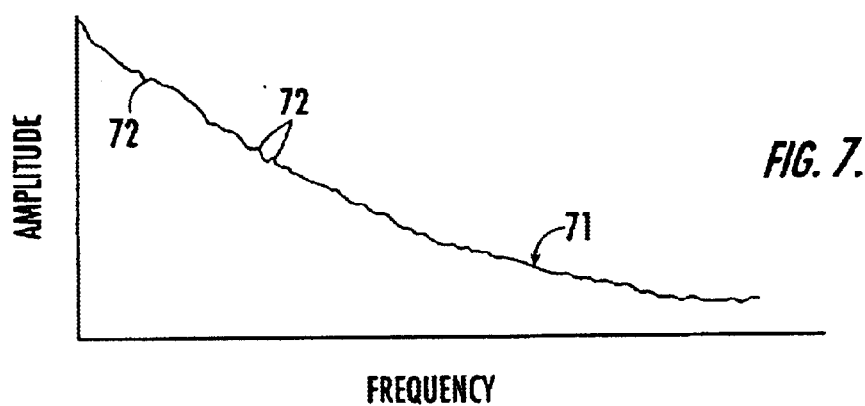
FIG. 7 shows the envelope of amplitude vs. frequency data for relatively large distances.
Figure 8:
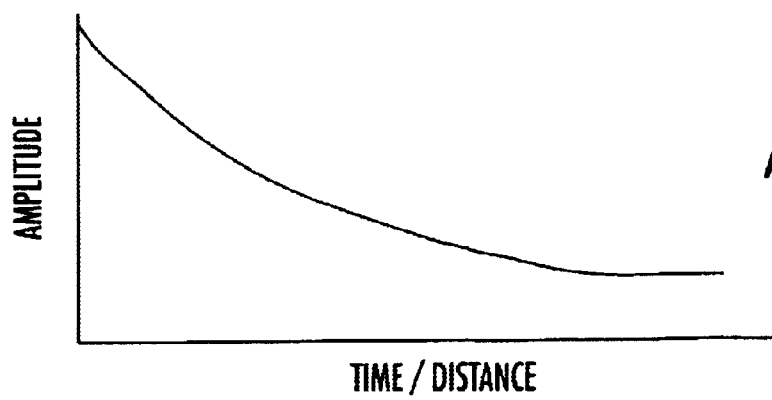
FIG. 8 shows an FFT amplitude vs. time/distance plot for the amplitude vs. frequency response data of FIG. 7.

For relatively short to medium distances, where the amplitude response data is essentially as shown in FIG. 4, its associated FFT or $FFT^{-1}$ is substantially as shown in FIG. 6, as having a well defined peak 61 associated with a reflection point along the time/distance axis (within the effective range of the system), from which respective concave-sloped portions 62 and 63 extend. For extended distances, however, the envelope of the response of the amplitude array may have an amplitude vs. frequency as shown at 71 in FIG. 7, which exhibits only very small variations 72 in the decaying amplitude response. When this waveform is Fourier processed, the resulting time/distance plot is essentially as shown in FIG. 8. As can be seen from a comparison of the respective pre- and post-Fourier processing response characteristics of FIGS. 7 and 8, the considerably reduced (SNR) amplitude perturbations along the amplitude array response 71 of FIG. 7 become almost unidentifiable in its FFT transform 81 of FIG. 8.

Figure 9:
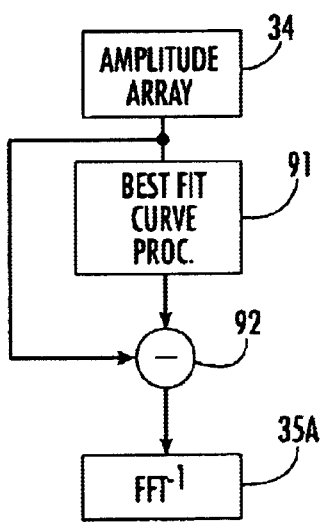
FIG. 9 is a block diagram of a 'best-fit' curve-based signal processing operator employed in a first embodiment of the invention.

Pursuant to a first embodiment of the invention, the precursor response filtering operator 51 is implemented as a 'best-fit' curve-based signal processing operator, a block diagram for which is shown in FIG. 9. The purpose of this signal processing operator is to generate a response characteristic which very closely 'fits' the decaying profile of the amplitude array along which ride the very small perturbations of a response such as that shown in FIG. 7. This best fit profile is then differentially combined with the original amplitude array; what results is a set of more clearly delineated amplitudes along the swept frequency band, so that they may be readily identified in the FFT to which the filtered data is applied.

More particularly, as shown in FIG. 9, the respective values of the amplitude array 34 are applied to a best fit curve-generator 91, and to a differential combiner 92. In accordance with a non-limiting embodiment, the best fit curve generator 91 may comprise least mean-squared error curve-based signal processing function, such as a Matlab FMINS( ) routine (which is based on the Nelder-Mead unconstrained, non-linear, minimization algorithm) and double precision floating-point processing. Suitable models that may be used in the calculation include, but are not limited to the following expressions:

$$y(x) = a + be^{-(cx + d\sqrt{x})}$$

$$y(x) = a/(1 + be^{-cx})$$

$$y(x) = a - be^{-cx^d}$$

The output of the best fit curve-generator 91 is also applied to the differential combiner 92, so as to obtain the desired a set of more clearly delineated amplitudes of the swept frequency band. These amplitude values are then applied to the FFT operator 35A, as described above.

Figure 10:
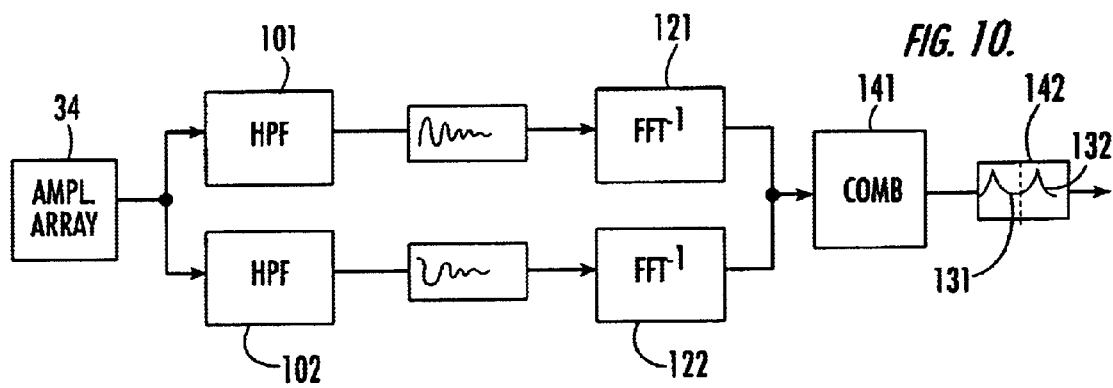
FIG. 10 is a block diagram of a high pass filter bank formed of a plurality of high-pass filters in accordance with a second embodiment of the invention.

Now, even though the best fit-curve approach of the first embodiment is effective in enhancing (high frequency)

amplitude components of the response array, that might otherwise be reduced or obscured for relatively long distance applications, it is relatively computationally intensive and requires substantial signal processing power. In accordance with a second embodiment of the invention, diagrammatically shown in FIGS. 10 and 11, these processing requirements can be reduced by implementing the precursor response filtering operator as a high pass filter bank formed of a plurality of high-pass filters 101 and 102, to which the amplitude array 34 is coupled in parallel.

Figure 11:
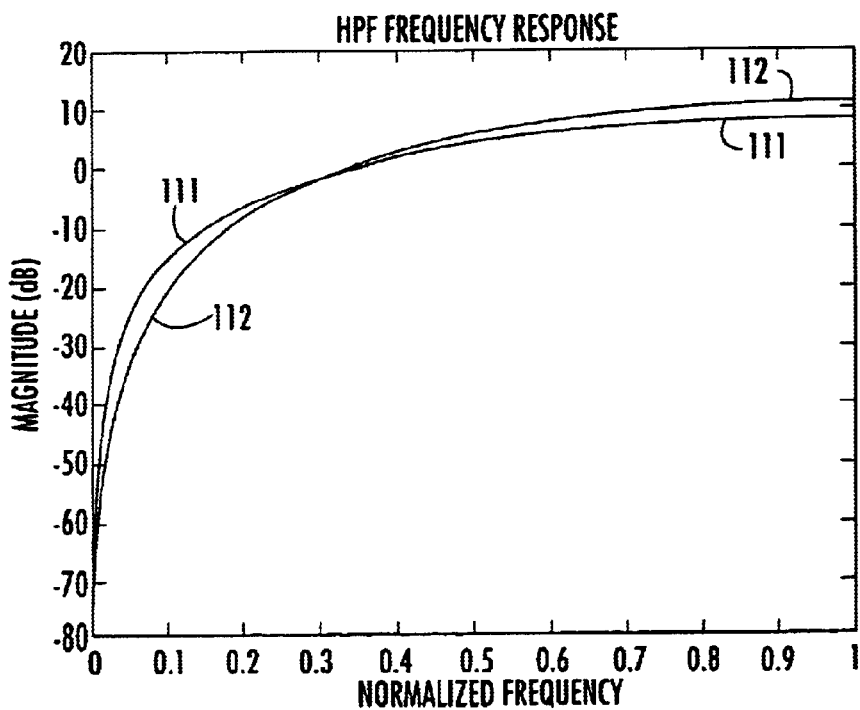
FIG. 11 shows Z-domain transfer functions of the respective high pass filters of the high pass filter bank of FIG. 10.

The Z-domain transfer functions of respective filters 101 and 102 are shown at curves 111 and 112 in the magnitude (in dB) vs normalized frequency plot of FIG. 11, and are associated with respectively different distance segments.

Using a base z-domain frequency response definition of $$H_{base}(z)=1-z^{-1},$$

the response characteristic 111 for filter 101 is:

$$H_{101}(z)=(1-z^{-1})^3=1-3z^{-1}+3z^{-2}-z^{-3},$$

and the response characteristic 112 for filter 102 is:

$$H_{102}(z)=(1-z^{-1})^4=1-4z^{-1}+6z^{-2}-4z^{-3}+z^{-4}.$$

The high pass filter 101 detects discontinuities at relatively short to medium distances (e.g., on the order of distances up to 10 Kft from the wireline access location) associated with relatively low frequency components, while the high pass filter 102 detects discontinuities at relatively greater distances (e.g., on the order of distances from 10 Kft to 18 Kft and beyond from the wireline access location) associated with relatively high frequency components.

The outputs of the high pass filters 101, 102 are respectively coupled to associated FFT operators 121, 122, whose outputs 131, 132 are piece-wise combined in a combiner 141, so as to realize a composite characteristic 142, that is effective to emphasize response components over the total distance of the two distance segments. The high pass filter 102 may include a level-shifter to provide for relatively smooth coupling of the two FFT responses. A valley or trough in the FFT-processed data indicates a tap followed by a peak that indicates a termination point of the lateral. Typically, if the end-of-the-line is observed, a peak indicates that occurrence.

Figure 12:
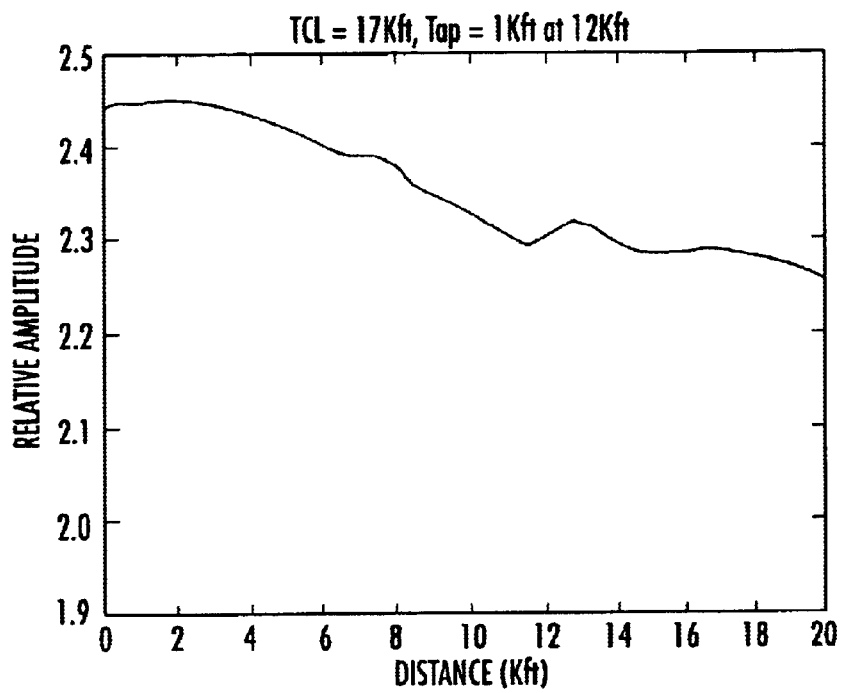
FIG. 12 shows the results of the application of the invention to a non-limiting cable plant example.

FIG. 12 shows the results of the application of the invention to a non-limiting example of a cable plant having an 18 Kft TCL with a tap located at 12 Kft of length 1 Kft. The tap and end-of-lateral are readily apparent at 12 Kft and 13 Kft, respectively, and the end-of-lateral can be identified at 17 Kft. (The test line produces the abnormality at 7–8 Kft.)

Although each of the above embodiments enhances the ability of an FDR system of the type described in the above-referenced '681 application to extract very small amplitude signals particularly those of the higher frequency tones, and thereby locate energy reflection anomalies such as bridged taps along a relatively extended distance wireline, the ability to process such reduced amplitude response signals means that the signal processing system must have a very large dynamic range. This requirement, in turn, implies that the resolution of the analog-to-digital converter that produces the data values of the amplitude array must be relatively wide. It should be noted that to process the response signal, only the envelope of each of the tones is necessary to derive relative amplitude. It is not necessary to sample the entire response waveform.

Figure 13:
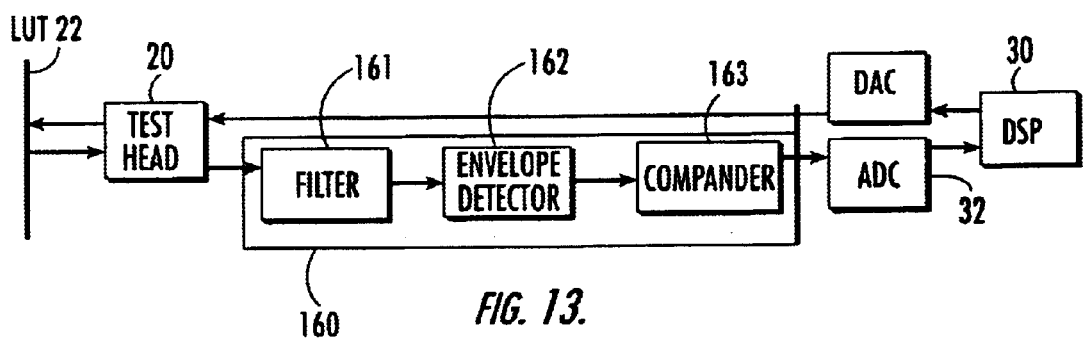
FIG. 13 diagrammatically illustrates a signal conditioning circuit.

As diagrammatically illustrated in FIG. 13, pursuant to a further aspect of the invention, this dynamic range issue is handled by installing a signal conditioning circuit 160 between test head 20 and analog-to-digital converter 32. The signal conditioning circuit 160 is comprised of a cascaded arrangement of a comb filter bank 161, an envelope detector 162 and a compander 163. The comb filter bank 161 contains N band-pass filters each having a passband centered at $f_i$, where $1<=i<=N$, N is the number of discrete tones and $f_i$ is the frequency of a respective tone.

The output of the N band-pass filter bank 161 is coupled to an envelope detector 162, which converts the tone at frequency $f_i$ into a constant (DC) level corresponding to the amplitude of the peaks of the tone. The output of the envelope detector 162 is coupled to a compander 163, which is employed to increase the gain of the higher frequencies, so that, given an exponentially decreasing function at its input, the compander 163 will produce an output that is relatively linear, with a more uniform representation in the input range of ADC 32. Thus, the compander takes advantage of the fact that the envelope detector outputs an exponentially decreasing function as N (and thereby $f_N$) increases. It also contains a DC level-shifter to bring the relative values of the tones whose envelopes are converted to DC values by the envelope detector 162 within the input range of the ADC 32.

As will be appreciated from the foregoing description, the problem of reduced signal-to-noise ratio associated with applying frequency domain reflectometry-based bridged tap detection to extended distance cable plants is successfully addressed in accordance with the present invention which installs a prescribed filtering operator, such as a 'best-fit' curve filter or a piecewise high pass filter bank, upstream of a Fourier processing operator. In the former case, the output of the best-fit curve filter is differentially combined with the original amplitude array, to realize a set of more clearly delineated amplitudes along the swept frequency band, which are readily identified in the FFT to which the filtered data is applied. In the latter case, differential distance-associated high pass filters of the high pass filter bank are piece-wise combined to obtain a composite filter characteristic that is effective to emphasize response components over the total distance of up to 18 Kft or more. As a further enhancement, dynamic range limitations of the analog-to-digital converter used to sample response tones are handled by installing a signal conditioning circuit between the test head and the analog-to-digital converter.

While we have shown and described several embodiments in accordance with the present invention, it is to be understood that the same is not limited thereto but is susceptible to numerous changes and modifications as known to a person skilled in the art, and we therefore do not wish to be limited to the details shown and described herein, but intend to cover all such changes and modifications as are obvious to one of ordinary skill in the art.

What is claimed is:

1. A method of automatically identifying the position of each of at least one energy reflection location along a wireline telecommunication link comprising the steps of:
    (a) coupling a varying frequency waveform to a first location of said wireline telecommunication link;
    (b) measuring a variation in signal level at said first location of said wireline telecommunication link in response to said varying frequency waveform;
    (c) filtering said variation in signal level measured in step (b) to increase the signal-to-noise ratio of high frequency components of said measured variation in signal level; and
    (d) performing frequency domain reflectometry processing of the filtered variation in signal level produced in step (c) to determine the distance between said first location and said position of said at least one energy reflection location along said wireline telecommunication link.

2. The method according to claim 1, wherein step (d) includes performing Fourier transform processing of said filtered variation in signal level produced in step (c).

3. The method according to claim 2, wherein said Fourier transform processing comprises Fourier transform processing said filtered variation in signal level in accordance with one of a Fast Fourier Transform and an inverse Fast Fourier Transform.

4. The method according to claim 1, wherein step (c) comprises filtering said variation in signal level measured in step (b) in accordance with a best fit curve-based precursor response filter whose amplitude vs. frequency profile is a best fit shape to the envelope of said variation in signal level.

5. The method according to claim 4, wherein said best fit curve-based precursor response filter comprises a least mean-squared error curve-based signal processing function.

6. The method according to claim 1, wherein step (c) comprises filtering said variation in signal level measured in step (b) in accordance with a plurality of high pass filters having respectively different transfer characteristics, and whose outputs are combined to obtain a composite filter characteristic that is effective to emphasize response components of said variation in signal level measured in step (b).

7. The method according to claim 1, wherein step (b) comprises conditioning said variation in signal level to produce a conditioned signal that accommodates digitizing parameters of an analog-to-digital converter, and digitizing said conditioned signal by means of said analog-to-digital converter.

8. The method according to claim 7, wherein step (b) comprises comb-filtering said variation in signal level, detecting the envelope produced by said comb-filtering, and companding said envelope, to produce said conditioned signal.

9. A frequency domain reflectometry-based bridged tap detection system for a telecommunication wireline comprising a precursor filter, installed upstream of a frequency domain reflectometry processor containing a Fast Fourier Transform operator, said precursor filter being configured to increase the signal-to-noise ratio of digitized amplitudes, produced by an analog-to-digital converter, of the response signal of said wireline as detected by a test head to the application to said wireline of a swept frequency band signal thereto, and further including a signal conditioning circuit, comprised of a comb filter bank, envelope detector and compander, installed between said test head and said analog-to-digital converter.

10. The frequency domain reflectometry-based bridged tap detection system according to claim 9, wherein said precursor filter comprises a plurality of high pass filters having respectively different transfer characteristics, and whose outputs are combined to obtain a composite filter characteristic that is effective to emphasize components of said response signal.

11. A system for automatically identifying energy reflection discontinuities along a wireline telecommunication link comprising a test signal generator that is operative to couple a varying frequency waveform to a measurement location of said wireline telecommunications link, in response to which said wireline propagates said varying frequency waveform to said energy reflection discontinuities, said energy reflection discontinuities reflecting energy back to said measurement location, a line monitoring receiver coupled to said measurement location of said wireline telecommunications link, a precursor filter that is operative to filter the response signal output of said line monitoring receiver, so as to increase the signal-to-noise ratio of high frequency components of said response signal output, and a response signal processor which is operative to execute a frequency domain reflectometry (FDR) algorithm to analyze the filtered response signal output of said precursor filter, and generate an output representative of locations of said energy reflection discontinuities.

12. The system according to claim 11, wherein said test signal generator is operative to generate a sinusoidal waveform that is varied between a minimum frequency and a maximum frequency.

13. The system according to claim 11, wherein said response processor is operative to execute a Fourier transform which decomposes the composite line signal response received by said line monitoring receiver and filtered by said precursor filter into frequency bins associated with frequency fluctuations of individual ones of said energy reflection discontinuities.

14. The system according to claim 13, wherein said Fourier transform comprises one of a Fast Fourier Transform and an inverse Fast Fourier Transform.

15. The system according to claim 12, wherein said precursor filter comprises a best fit curve-based precursor response filter whose amplitude vs. frequency profile is a best fit shape to the envelope of said response signal.

16. The system according to claim 15, wherein said best fit curve-based precursor response filter comprises a least mean-squared error curve-based signal processing function.

17. The system according to claim 12, wherein said precursor filter comprises a plurality of high pass filters having respectively different transfer characteristics, and whose outputs are combined to obtain a composite filter characteristic that is effective to emphasize components of said response signal.

18. The system according to claim 12, wherein said line monitoring receiver includes a digitizer that is operative to digitize the amplitude of the measured signal response of said line in association with the variation of the frequency of said sinusoidal waveform.

19. The system according to claim 18, wherein said line monitoring receiver includes a signal conditioning circuit that is configured to condition said line response signal, so as to produce a conditioned line response signal that accommodates digitizing parameters of said digitizer.

20. The system according to claim 19, wherein said signal conditioning circuit comprises a cascaded arrangement of a comb-filter, an envelope detector, and a compander.

* * * * *